United States Patent [19]

Shigematsu et al.

[11] 4,413,599
[45] Nov. 8, 1983

[54] IGNITION TIMING CONTROL SYSTEM IN A SPARK IGNITION TYPE INTERNAL COMBUSTION ENGINE

[75] Inventors: Takashi Shigematsu; Tomoyuki Watanabe; Daisaku Sawada, all of Shizuoka, Japan

[73] Assignee: Toyota Jidosha Kogyo Kabushiki Kaisha, Toyota, Japan

[21] Appl. No.: 223,082

[22] Filed: Jan. 7, 1981

[30] Foreign Application Priority Data

Jan. 7, 1980 [JP] Japan ............................ 55-000398

[51] Int. Cl.³ .............................................. F02P 5/14
[52] U.S. Cl. ...................................... 123/425; 123/416
[58] Field of Search ............... 123/425, 416, 419, 435, 123/479; 73/35

[56] References Cited

U.S. PATENT DOCUMENTS

| | | | |
|---|---|---|---|
| 4,116,173 | 9/1978 | McDougal et al. | 123/425 |
| 4,120,272 | 10/1978 | Douaud et al. | 123/425 |
| 4,127,088 | 11/1978 | Ezoe | 123/479 |
| 4,243,007 | 1/1981 | Ehrhardt et al. | 123/425 |
| 4,282,841 | 8/1981 | Takagi et al. | 123/425 |
| 4,289,102 | 9/1981 | Katsumata et al. | 123/425 |

Primary Examiner—Charles J. Myhre
Assistant Examiner—Andrew M. Dolinar
Attorney, Agent, or Firm—Cushman, Darby & Cushman

[57] ABSTRACT

An ignition timing control system in a spark ignition type internal combustion engine which has multiple cylinders, wherein ignition pulses generated in accordance with the operating condition of the engine are delayed in response to knockings detected to control the ignition timings to the optimum advance conditions free from knockings, has such characteristic features that respective cylinders of the engine are controlled in ignition timing independently of one another, a detected knocking signal is divided for the respective cylinders and only the ignition pulses corresponding to the cylinders of knocking is delayed so that the optimum advance conditions for the respective cylinders can be obtained.

6 Claims, 9 Drawing Figures

IGNITION TIMING CONTROL SYSTEM IN A SPARK IGNITION TYPE INTERNAL COMBUSTION ENGINE

BACKGROUND OF THE INVENTION

1. Field of the Invention

The present invention relates to ignition timing control systems in spark ignition type internal combustion engines which have multiple cylinders, and particulrly to improvements in an ignition timing control system in a spark ignition type internal combustion engines, particularly suitable for use in a gasoline engine mounted on a motor car, wherein ignition pulses generated in accordance with the operating condition of the engine are delayed in response to knockings detected to control the ignition timings to the optimum advance conditions free from knockings.

2. Description of the Prior Art

In general, knockings in the internal combustion engines (hereinafter referred to as an "engine") are dangerous phenomena which may cause even a breakdown of the engine at the worst. Consequently, ignition timings of the engines have been controlled to the predetermined ignition timings in such a manner that the load and rotational number of the engine are measured and the values thus measured are utilized not to cause knockings to the engine. As such ignition timing control systems, heretofore, there have been used various types of systems including mechanical systems, electrical systems and the like. In any one of these systems the preset ignition timings have been set providing an allowance to a certain extent in ignition timing from the limits of knocking (the point where knocking takes place) because there have been dispersions in tolerances and adjustments of the system as a product. However, it is not desirable to provide an allowance in ignition timing from the limits of knocking from the viewpoint of economics of fuel consumption and possible loss in output power.

Figure 1:
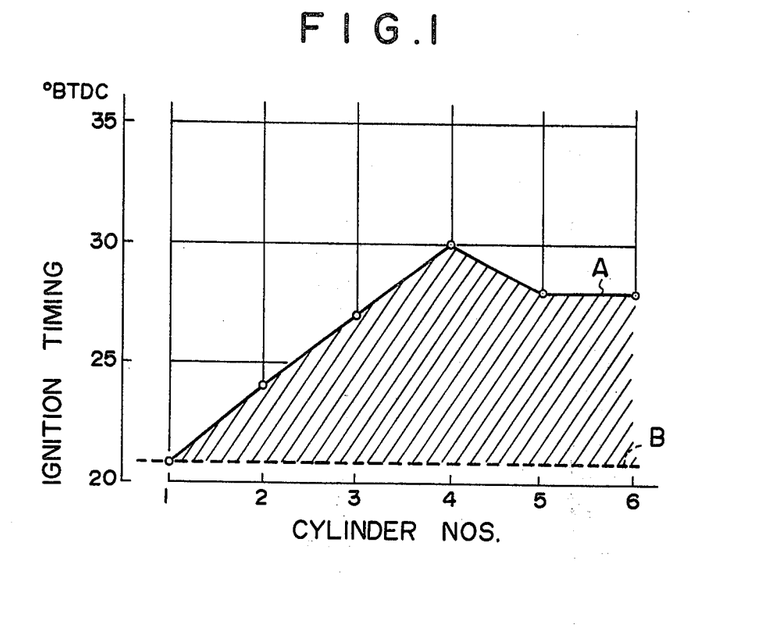
FIG. 1 is a chart showing the relationship between the respective cylinders and the ignition timings where the knocking begins to occur.

In recent years, in order to obviate the abovedescribed disadvantages, there has been developed an ignition timing control system in which knockings are detected by use of knocking sensors to detect the condition of the engine at the limits so that ignition timings can be feedback controlled to the optimum advance conditions free from knockings. The abovedescribed ignition timing control systems can eliminate the necessity of the provision of the allowance in the preset values of ignition timings which would otherwise have been necessary so that improvements in fuel combustion and the like can be expected therefrom. However, in the case of a multiple cylinder engine, there may be a wide dispersion in the limits of knocking because respective cylinders are different in quantity of intake air and air-fuel ratio of mixture from one another, in general. FIG. 1 shows the knocking occurring points differing from one cylinder to another in a six-cylinder engine, in which a solid line A shows the ignition timings where the knockings begin to occur. In this engine, there is a 10 degree difference in crank angle between the ignition timings at the maximum. If the abovedescribed knocking feedback control is effected in this condition, then, in order to detect occurrence of a knocking to control the ignition timings, an ignition timing for a cylinder following the cylinder of the knocking becomes an ignition timing for No. 1 cylinder having the latest ignition timing as indicated by a broken line B in FIG. 1, so that adverse effects may be caused to the fuel consumption and the like within the scope corresponding to a hatched region between the broken line B and the solid line A.

SUMMARY OF THE INVENTION

The present invention has been developed to obviate the abovedescribed disadvantages of the prior art and has as its object the provision of an ignition timing control system for use in a spark ignition type internal combustion engine which has multiple cylinders, wherein the fuel consumption and output of the engine can be improved to the maximum even where the limits of knocking in a multiple cylinder engine are widely dispersed from one cylinder to another.

According to the present invention, in an ignition timing control system for use in a spark ignition type internal combustion engine which has multiple cylinders, wherein ignition pulses generated in accordance with the operating condition of the engine are delayed in response to knockings detected to control the ignition timings to the optimum advance conditions free from knockings, characterized in that respective cylinders of the engine are controlled in ignition timing independently of one another, a detected knocking signal is divided for the respective cylinders and only the ignition pulses corresponding to the cylinders of knocking is delayed so that the optimum advance conditions for the respective cylinders can be obtained, and differences in critical ignition timing between the respective cylinders which should inevitably occur in an engine having multiple cylinders can be automatically corrected, so that ignition timings can be set to the optimum advance conditions irrespective of dispersions in operation between the respective cylinders which would otherwise have not been coped with, thereby enabling to offer such advantages that the optimum outputs can be obtained from the respective cylinders and improvements in output power and fuel consumption can be collectively achieved to a considerable extent.

Figure 2:
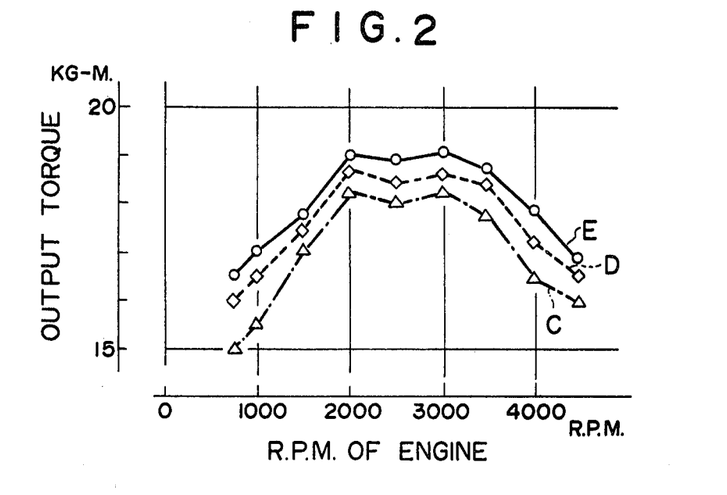
FIG. 2 is a chart showing the comparison between the rotational numbers of the engine and the output torques in the conventional example and the embodiment of the present invention.
Figure 3:
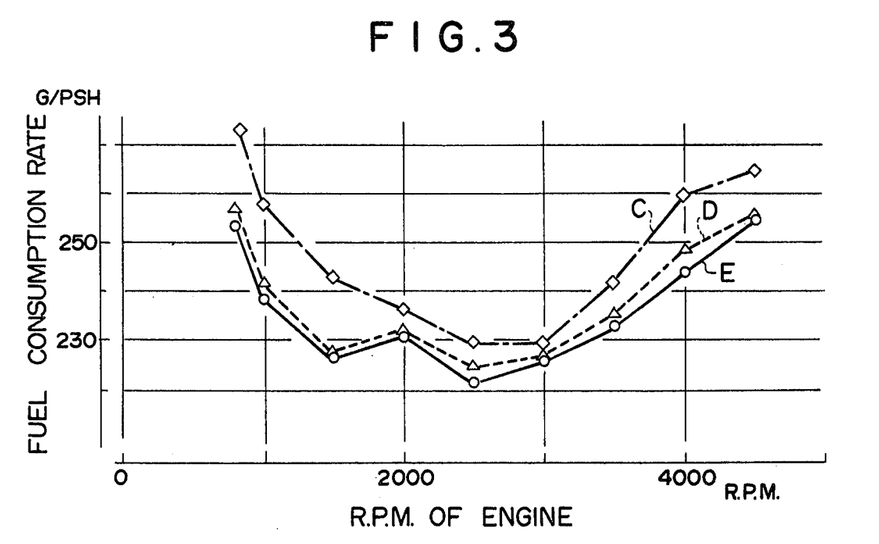
FIG. 3 is a chart showing the comparison between the rotational numbers of the engine and the fuel consumption rate in the conventional example and the embodiment of the present invention.

According to the experiments conducted by the present inventor, an output torque in a six-cylinder engine provided therein with a carburetor type fuel supply system is indicated by a one-dot chain line C in FIG. 2 in an ignition timing control system not performing knocking feedback control at all, and indicated by a broken line D in FIG. 2 when the conventional knocking feedback control is performed. Whereas, when the knocking feedback control for the respective cylinders are performed according to the present invention, the output torque is indicated by a solid line E in FIG. 2, in which case it is apparent that such considerable improvements have been made over the total number of rotations of the engine as compared with the case not performing knocking feedback control to 1–1.5 Kg-m and as compared with the case performing knocking feedback control to 0.5–1 Kg-m. Furthermore, in the case of not performing knocking feedback control, the fuel consumption rate is indicated by a one-dot chain line C in FIG. 3, and in the case of performing the conventional knocking feedback control, the fuel consumption rate is indicated by a broken line D in FIG. 3. Whereas, in the case of performing the knocking feedback control for the respective cylinders according to the present invention, the fuel consumption rate is indicated by a solid line E in FIG. 3, in which case it is apparent that improvements have been seen.

BRIEF DESCRIPTION OF THE DRAWINGS

The abovementioned features and objects of the present invention will become more apparent by reference to the following description taken in conjunction with the accompanying drawings, wherein like referenced numerals denote like elements, and in which.

DETAILED DESCRIPTION OF THE INVENTION

Figure 4:
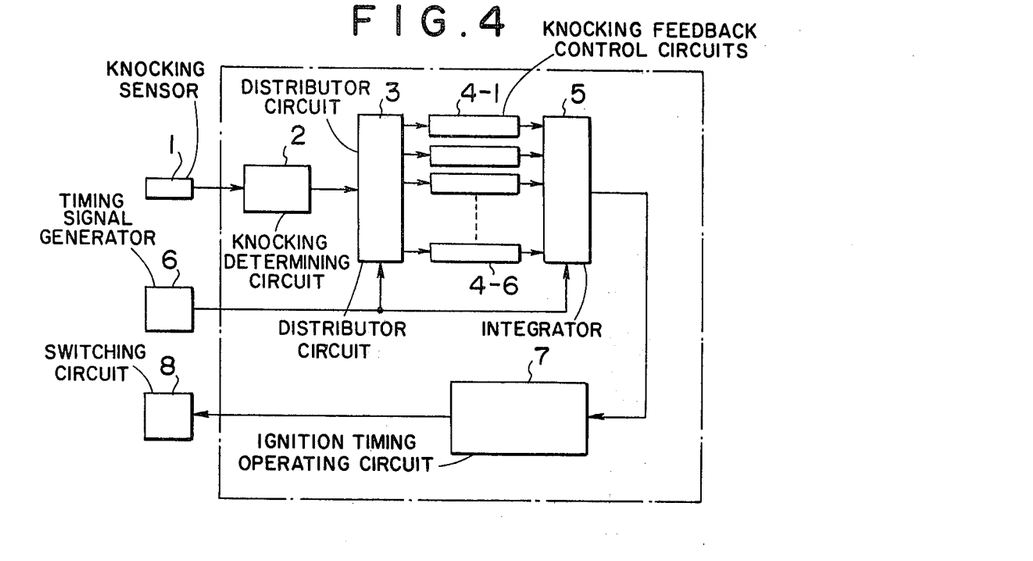
FIG. 4 is a block diagram showing the general arrangement of a first embodiment of the ignition timing control system according to the present invention.

Detailed description will hereunder be given of embodiments of the present invention with reference to the drawings. As shown in FIG. 4, a first embodiment of the present invention includes: a knocking sensor 1 formed of a vibration sensor, a microphone or the like, for detecting knocking conditions of the engine from vibrations of the main body of the engine or noises caused by the vibrations, a knocking determining circuit 2 for determining whether the magnitude of knocking is large enough to be controlled in response to the output signals from the knocking sensor; a distributor circuit 3 for determining in which cylinders the knockings determined in said knocking determining circuit 2 have taken place and distributing knocking determining signals to the respective cylinders accordingly; knocking feedback control circuits 4-1 to 4-6 for operating ignition timing control signals for the respective cylinders in response to the output signals from said distributor circuit; an integrator circuit 5 for integrating into a single signal the operations results for the respective cylinders emitted from said knocking feedback control circuits 4-1 to 4-6; a timing signal generator circuit 6 for supplying a timing signal for determining the cylinders in synchronism with the rotation of the engine to said distributor circuit 3 and said integrator circuit 5; an ignition timing operating circuit 7 for operating the actual ignition timings in response to the output signals from said integrator circuit 5; and a switching circuit 8 for ON-OFF operating an ignition coil primary current in response to an output signal from said ignition timing operating circuit 7.

Figure 5:
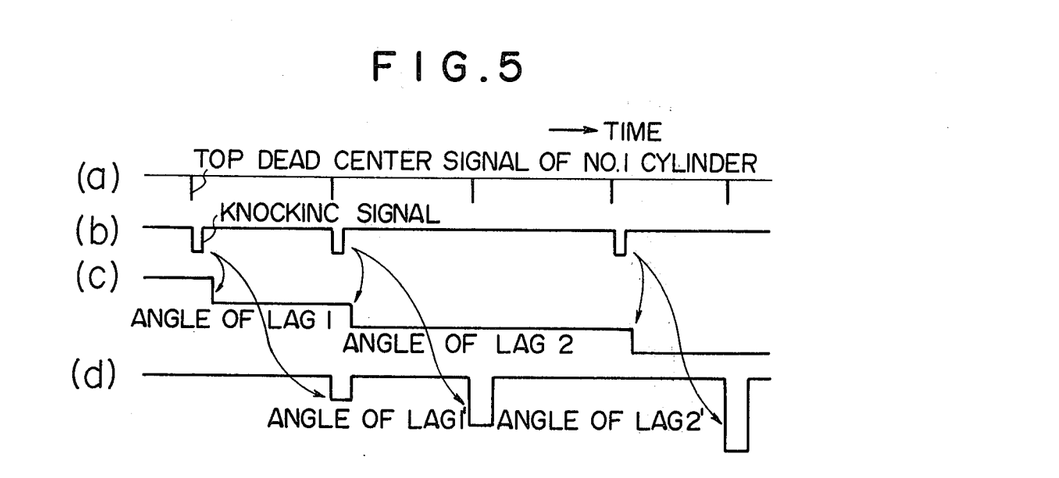
FIG. 5 is a chart showing the general action in the first embodiment.

Action will now be generally described. In the ignition timing control system with the abovedescribed arrangement, when the engine is in the knocking condition, knockings are detected by the knocking sensor 1 and determined by the knocking determining circuit 2. Now, if knocking signals are determined from only No. 1 cylinder as shown in FIG. 5(b) corresponding to the top dead center signals of No. 1 cylinder as shown in FIG. 5(a), in the case of the knocking feedback control of the prior art, the ignition timing of the succeeding cylinder is immediately delayed in response to the knocking signal as shown in FIG. 5(c), and further, the ignition timings of Nos. 2 to 6 cylinders are also delayed in response to the knocking signal for No. 1 cylinder (See the angle of lag 1 and angle of lag 2). In contrast to the above, in the present embodiment, as shown in FIG. 5(d), in response to signals from the distributor circuit 3 and timing signal generator circuit 6, the knocking signal shown in FIG. 5(b) is determined as to which cylinder it corresponds to, and distribution of signals is made to the knocking feedback control circuits 4-1 to 4-6 provided corresponding to the cylinders. If the knocking takes place only in No. 1 cylinder as shown in FIG. 5(b), the ignition timing is not immediately delayed, but the succeeding ignition timing of No. 1 cylinder is controlled to be delayed (See the angle of lag 1' and angle of lag 2'). The signals thus obtained for the respective cylinders are integrated into a signal corresponding to the respective cylinders in response to signals from the integrator circuit 5 and timing signal generator circuit 6, and converted into ignition timings in the ignition timing operating circuit 7. In response to the output signals from this ignition timing operating circuit 7, ignitions are performed by the switching circuit 8 for actually driving an ignition coil.

Figure 6:
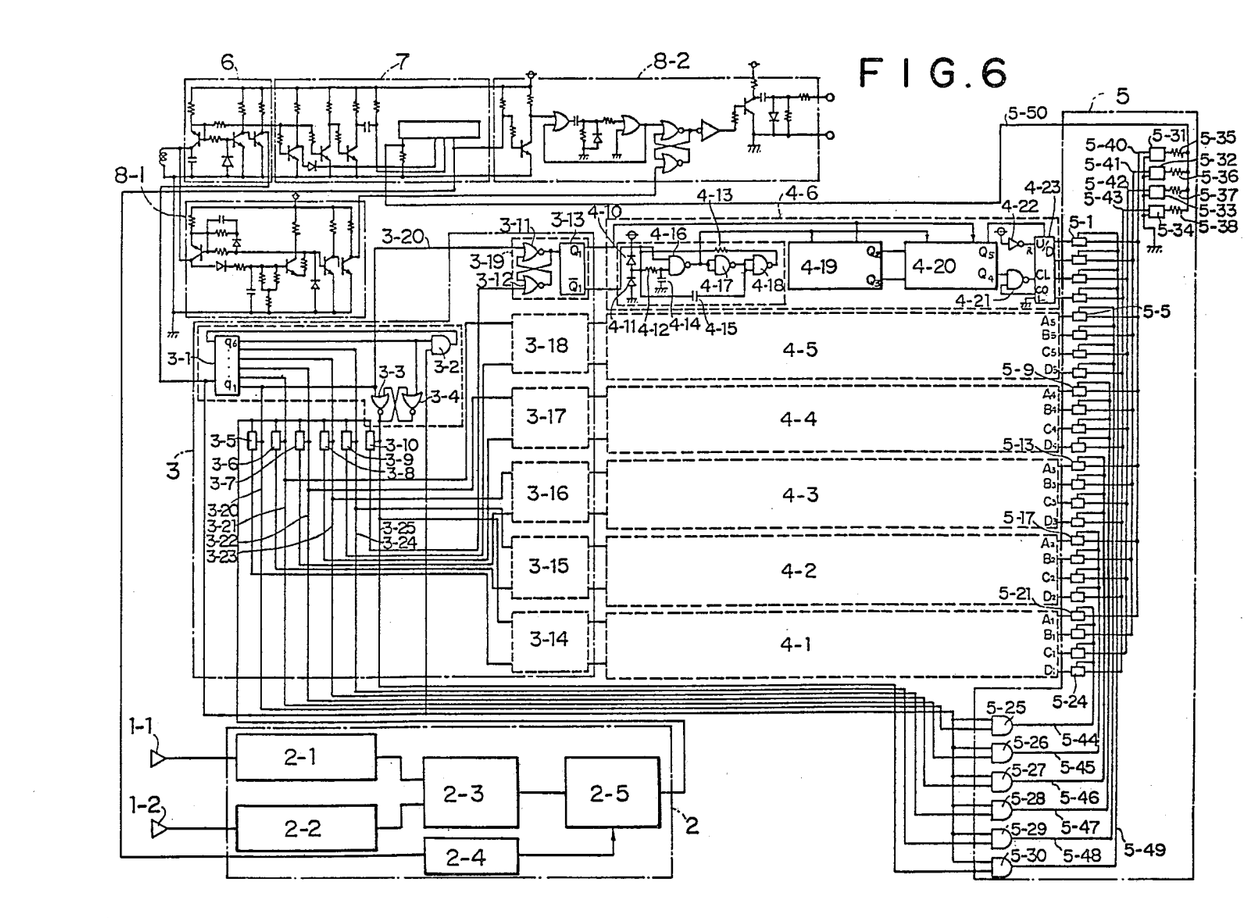
FIG. 6 is an electric circuit arrangement diagram showing the specific examples of electric circuits in the first embodiment.

Description will hereunder be given of the specific arrangements of the respective circuits with refernce to FIG. 6. The same parts as those in the block diagram of FIG. 4 are designated by the same reference numerals. Additionally, in this embodiment, the engine has six cylinders and two knocking sensors 1 are provided between Nos. 1 and 2 cylinders and between Nos. 5 and 6 cylinders for example.

The knocking determining circuit 2 includes: signal process circuits 2-1 and 2-2 provided corresponding to said knocking sensors 1-1 and 1-2; a knocking sensor signal combining circuit 2-3 for integrating outputs from said signal process circuits 2-1 and 2-2; a masking circuit 2-4 for preventing erroneous knocking detection due to noises including beating sounds of valves, sounds of combustion, vibrations of the engine and the like; and a knocking detecting circuit 2-5 for detecting knocking signals to be controlled being free from the influences of the noises in response to the outputs from said knocking sensor signal combining circuit 2-3 and said masking circuit 2-4. In this knocking determining circuit 2, an output from the knocking sensor 1-1 is supplied to the signal process circuit 2-1 and an output from the latter is supplied to the knocking sensor signal combining circuit 2-3. Likewise, an output from the knocking sensor 1-2 is supplied to the signal process circuit 2-2, and an output from the latter is supplied to the knocking sensor signal combining circuit 2-3. Supplied to the masking circuit 2-4 is an output from the ignition timing operating circuit 7, whereby the knocking detecting circuit 2-5 is allowed to be operated only in the proximity of the ignition timings for example. The knocking detecting circuit 2-5 is adapted to detect as the knockings signals above a predetermined level out of outputs from the knocking sensor signal combining circuit 2-3 within the crank angle allowed in the masking circuit 2-4. An output from this knocking detecting circuit 2-5 is supplied to the distributor circuit 3.

The distributor circuit 3 includes: a frequency dividing circuit consisting of a Johnson counter 3-1, AND gate 3-2 and an RS flipflop constituted by NOR gates 3-3,3-4; analog switches 3-5 to 3-10 connected to output ends of said frequency dividing circuit, respectively; and knocking pulse delaying circuits connected to output ends of said analog switches 3-5 to 3-10, respectively and each including a flipflip consisting of NOR gates 3-11,3-12 and a monostable multivibrator 3-13. Supplied to the Johnson counter 3-1 in the frequency dividing circuit is an output from the timing signal generator circuit 6 synchronized with a distributor, and an output end of this frequency dividing circuit is connected to control terminals of the analog switches 3-5 to 3-10 through signal lines 3-20 to 3-25. Outputs from the analog switches 3-5 to 3-10 are supplied to the knocking pulse delaying circuits 3-14 to 3-19 each at one side thereof. Furthermore, connected to input terminals of the knocking pulse delaying circuits 3-14 to 3-19 each at the other side thereof are signal lines 3-25 to 3-30 in the order as described, respectively. Outputs from these knocking pulse delaying circuits 3-14 to 3-19 are supplied to the knocking feedback control circuits 4-1 to 4-6.

The knocking feedback control circuits 4-1 to 4-6 each includes: an oscillator circuit consisting of diodes 4-10, 4-11, resistors 4-12, 4-13, capacitors 4-14, 4-15, and NAND gates 4-16 to 4-18; a timing operating circuit 4-19; a knocking control circuit 4-20; a NAND gate 4-21, a NOT gate 4-22; and an updown counter 4-23; all of which are provided corresponding to the respective cylinders. Respectively supplied to the oscillator circuits in these knocking feedback control circuits 4-1 to 4-6 are outputs $Q_1$ from the knocking pulse delaying circuits 3-14 to 3-19 in the distributor circuit 3. Outputs from these oscillator circuits are supplied to the timing operating circuit 4-19 and knocking control circuit 4-20, respectively. Furthermore, outputs $Q_1$ from the knocking pulse delaying circuits 3-14 to 3-19 are also supplied to the timing operating circuit 4-19 and knocking control circuit 4-20, respectively. Outputs $Q_2$, $Q_3$ from the timing operating circuit 4-19 are supplied to the knocking control circuit 4-20, respectively. Additionally, an output $Q_4$ from the knocking control circuit 4-20 is supplied to the NAND gate 4-21 at one side thereof. Supplied to the other side of the NAND gate 4-21 is a carryout CO from the updown counter 4-23. An output of this NAND gate 4-21 is supplied to a clock terminal CL of the updown counter 4-21. Furthermore, an output $Q_5$ from said knocking control circuit 4-20 is supplied to an updown terminal U/D of the updown counter 4-23. Supplied to a reset terminal R of this updown counter 4-23 is an output from a low level setting circuit consisting of a NOT gate 4-22. Additionally, a load terminal L of the updown counter 4-23 is grounded. Outputs $A_1$ to $D_1$, $A_2$ to $D_2$, $A_3$ to $D_3$, $A_4$ to $D_4$, $A_5$ to $D_5$ and $A_6$ to $D_6$ from these knocking feedback control circuits 4-1 to 4-6 are supplied to the aforesaid integrator circuit 5.

The integrator circuit 5 includes: analog switches 5-1 to 5-24; AND gates 5-25 to 5-30; analog switches 5-31 to 5-34; and resistors 5-35 to 5-38. Outputs of $A_6$ to $D_6$, $A_5$ to $D_5$, $A_4$ to $D_4$, $A_3$ to $D_3$, $A_2$ to $D_2$ and $A_1$ to $D_1$ from the knocking feedback control circuits 4-6 to 4-1 are connected to input terminals of the analog switches 5-1 to 5-24, respectively. Furthermore, the outputs $A_6$, $A_5$, $A_4$, $A_3$, $A_2$ and $A_1$ from the analog switches 5-1, 5-5, 5-9, 5-13, 5-17 and 5-21 are connected to a signal line 5-40, outputs $B_6$, $B_5$, $B_4$, $B_3$, $B_2$ and $B_1$ from the analog switches 5-2, 5-6, 5-10, 5-14, 5-18 and 5-22 are connected to a signal line 5-41, outputs $C_6$, $C_5$, $C_4$, $C_3$, $C_2$ and $C_1$ from the analog switches 5-3, 5-7, 5-11, 5-15, 5-19 and 5-23 are connected to a signal line 5-42, the outputs $D_6$, $D_5$, $D_4$, $D_3$, $D_2$ and $D_1$ from the analog switches 5-4, 5-8, 5-12, 5-16, 5-20 and 5-24 are connected to a signal line 5-43, respectively. Furthermore, supplied to the AND gates 5-25 to 5-30 each at one side thereof is output from said timing signal generator circuit 6, respectively, and connected to the AND gates 5-25 to 5-30 each at the other side thereof are the signal line 3-20 to 3-25, respectively. Additionally, outputs from the AND gates 5-25 to 5-30 are supplied to signal lines 5-44 to 5-49, respectively. The signal line 5-44 is connected to control terminals of the analog switches 5-21 to 5-24, the signal line 5-45 to control terminals of the analog switches 5-17 to 5-20, the signal line 5-46 to control terminals of the analog switches 5-13 to 5-16, the signal line 5-47 to control terminals of the analog switches 5-9 to 5-12, the signal line 5-48 to control terminals of the analog switches 5-5 to 5-8, the signal line 5-49 to control terminals of the analog switches 5-1 to 5-4, respectively. Furthermore, the signal lines 5-40 to 5-43 are connected to control terminals of the analog switches 5-31 to 5-34 and outputs therefrom are all grounded. Further, outputs from the analog switches 5-31 to 5-34 are connected to a signal line 50 through resistors 5-35 to 5-38, respectively, and then, supplied to the ignition timing operating circuit 7.

An output from the timing signal generator circuit 6 is supplied to the ignition timing operating circuit 7, and a output from the latter is supplied to the switching circuit 8. In addition, everything is publicly known about the timing signal generator circuit 6, the ignition timing operating circuit 7 and the switching circuit 8 consisting of a switching circuit 8-1 and a closed angle control circuit 8-2, so that detailed description thereof will be omitted.

Figure 7:
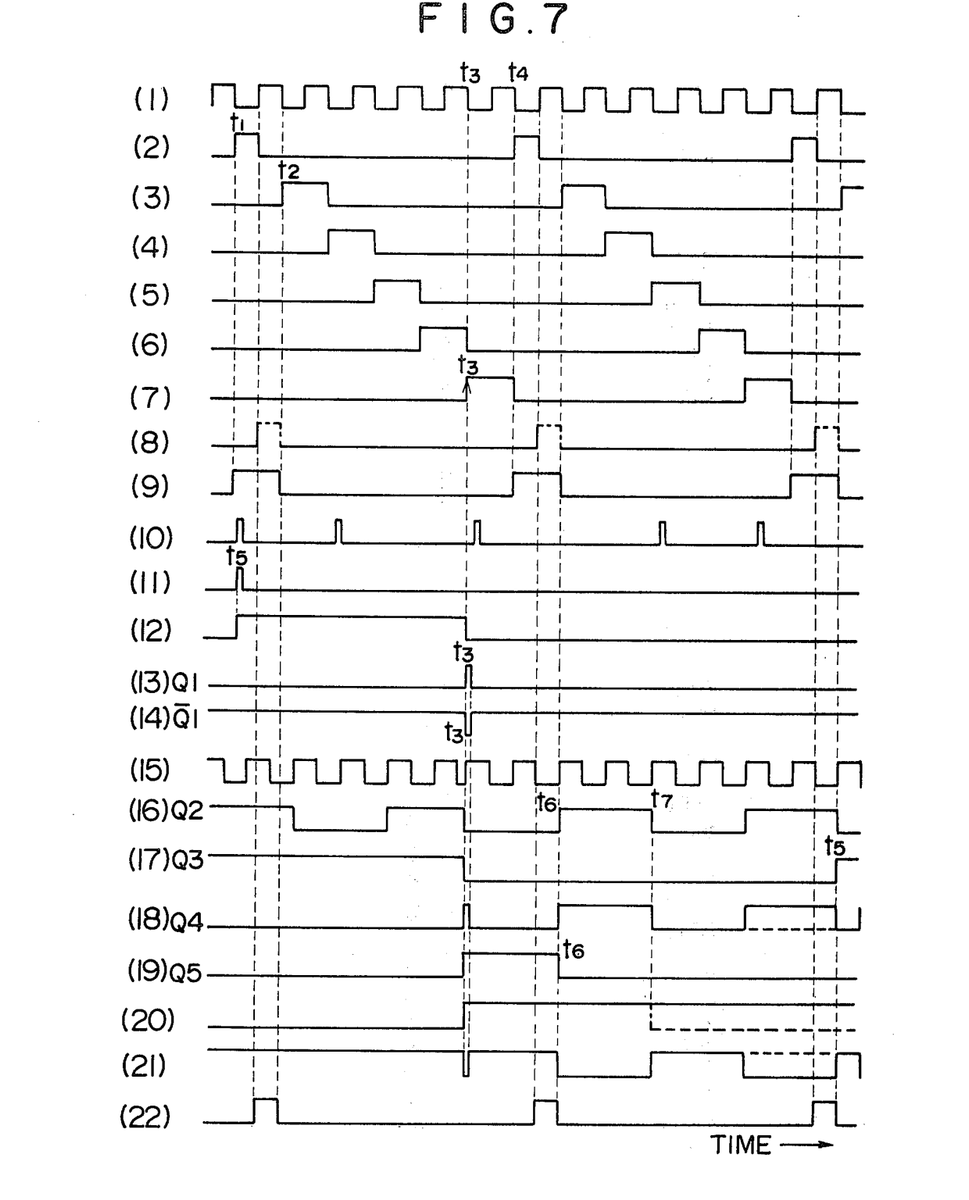
FIG. 7 is a chart showing performance waveshapes in various portions in the specific examples of electric circuits shown in FIG. 6.

Actions of the respective circuits will hereunder be described with reference to a time chart shown in FIG. 7. Outputs from the knocking sensors 1-1 and 1-2 for detecting vibrations of the engine are processed in the signal process circuits 2-1 and 2-2, respectively, and then, supplied to the knocking sensor signal combining circuit 2-3. In this knocking sensor signal combining circuit 2-3, only one of the outputs from either the knocking sensor 1-1 or 1-2 which is larger than the other is selected and supplied to the knocking detecting circuit 2-5. The knocking detecting circuit 2-5 receives outputs from the masking circuit 2-4 to detect knocking so as not to erroneously determine the noises including beating sounds of values, sounds of combustion and the like as the knocking. An output from the knocking detecting circuit 2-5 is supplied to the distributor circuit 3 as a knocking determining pulses, and then, supplied to input terminals of the analog switches 3-5 to 3-10. The distributor circuit 3 distributes knocking determining pulses to the respective cylinders in response to an output from the timing signal generator circuit 6 which is in synchronism with a distributor of the engine. In an output of this timing signal generator circuit 6, the fall of pulse serves as the ignition timing in a full transistor type ignition system of the prior art. With this arrangement, the knocking determining pulses are distributed between an ignition to another, i.e., between the rise to fall of the timing signal generator circuit 6. FIG. 7(1) shows an output from the timing signal generator circuit 6. The output of the timing signal generator circuit 6 is frequency-divided by the rises of output pulses for six cylinders (pulses) in the Johnson counter 3-1 of the distributor circuit 3. With this arrangement, the Johnson counter 3-1 takes heptad scale. In order to make it hexad scale, an AND gate 3-2 takes the "AND" of an output $q_6$ from the Johnson counter 3-1 and an output from the timing signal generator circuit 6, and an output from the latter (See FIG. 7(8)) is supplied to a reset terminal of the Johnson counter 3-1. With this arrangement, as shown in FIG. 7(2), only the output $q_6$ from the Johnson counter 3-1 does not become a fall signal at the fall of an output of the timing signal generator circuit 6. To correct this, the output $q_6$ from the Johnson counter 3-1 is supplied one NOR gate 3-4 of the RS flipflop consisting of the NOR gates 3-3 and 3-4, an output $q_1$ (See FIG. 7(3)) from the Johnson counter 3-1 is supplied to the other NOR gate 3-3. With this arrangement, any one of outputs from the RS flipflop comes to be of H level at the rise $t_1$ of the output $q_6$, and comes to be of L level at the rise $t_2$ of the output $q_1$ (See FIG. 7(9)). These outputs are connected to the signal lines 3-20 to 3-25, and supplied to the control terminals of the analog switches 3-5 to 3-10. With this arrangement, the knocking determining pulses are distributed to the respective cylinders. FIG. 7(10) shows the knocking determining pulses, and FIG. 7(11) shows the knocking determining pulses distributed by the signal line 3-25. Thereafter, one and the same circuit is described, so that description will be given of only the action of the signals distributed by the signal line 3-25. The knocking determining pulses are subjected to the knocking feedback operation between $t_3$ and $t_4$ before the following ignition timing. For this purpose, the distributed pulses are supplied to one NOR gate 3-12 of the RS flipflop consisting of the NOR gates 3-11 and 3-12 of the knocking pulse delaying circuits 3-14 to 3-19. Supplied to the other NOR gate 3-11 is an output from the signal line 3-20. With this arrangement, an output from the RS flipflop comes to be of H level at the rise timing $t_5$ of the knocking determining pulse, and comes to be of L level at the rise timing $t_3$ of the output of the signal line 3-20 (See FIG. 7(12)). This output is supplied to the monostable multivibrator 3-13 to generate a pulse at the fall (See FIGS. 7(13) and 7(14)). This output $Q_1$ is supplied to the timing operating circuit 4-19 and the knocking control circuit 4-20. Furthermore, the output $Q_1$ is supplied as a trigger to an oscillator circuit of the knocking feedback control circuit 4-6. An output of this oscillator circuit (See FIG. 7(15)) is synchronized by the timing of $t_3$, and supplied to the timing operating circuit 4-19 and the knocking control circuit 4-20. An output $Q_2$ from the timing operating circuit 4-19 (See FIG. 7(16)) is synchronized by the timing of $t_6$, and comes to be in cycles of four times the cycle of the oscillator circuit. Furthermore, an output $Q_3$ (See FIG. 7(17)) comes to be of L level at the timing of $t_3$, and comes to be of H level at the timing of $t_5$. Namely, signals are generated in cycles of 16 times the cycle of the oscillator circuit. These signals are supplied to the knocking control circuit 4-20, respectively. An output $Q_4$ from the knocking control circuit 4-20 (See FIG. 7(18)) comes to be of H level at $t_3$, pulses are generated in cycles of four times the cycle of the oscillator circuit during first and second cycles, and after $t_5$, outputs of the oscillator circuit are generated. This output $Q_4$ is supplied to the NAND gate 4-21 at one side thereof. Furthermore, an output $Q_5$ from the knocking control circuit 4-20 (See FIG. 7(19)) comes to be of H level at the timing of $t_3$, comes to be of L level at the timing of $t_6$, and is supplied to the updown terminal U/D of the updown counter 4-23. Supplied to the other side of the NAND gate 4-21 is an output (See FIG. 7(20)) from the carryout terminal CO of the updown counter 4-23. The foregoing description is true of the case where many knocking determining pulses have been previously generated. In the case where the knocking determining pulses is limited to only one, the carryout output comes to be of H level at the timing of $t_3$, and comes to be of L level at the timing of $t_2$. With this arrangement, an output from the NAND gate 4-21 is prevented from being emitted and no pulse is generated after the timing $t_7$ as indicated by a broken line in FIG. 7(21). An output from this NAND gate 4-21 is supplied to the clock terminal CL of the updown counter 4-23. Signals thus counted are emitted from the output terminals of $A_6$ to $D_6$ of the updown counter 4-23 as BCD signals of four bits. The outputs from $A_6$ to $D_6$ are supplied to the input terminals of the analog switches 5-1 to 5-4 of the integrator circuit 5. In the integrator circuit 5, an output from the timing signal generator circuit 6 is supplied to the AND gates 5-25 to 5-30 each at one side thereof, and outputs from the signal lines 3-20 to 3-25 are supplied to the AND gates 5-25 to 5-30 each at the other side thereof, respectively. An output from this AND gate 5-30 is supplied to the control terminals of the analog switches 5-1 to 5-4, by the timings of which outputs from $A_6$ to $D_6$ are supplied to the signal lines 5-40 to 5-43. Outputs from the signal lines 5-40 to 5-43 are supplied to the control terminals of the analog switches 5-31 to 5-34, control signals thus obtained are converted into analog signals and supplied to the ignition timing operating circuit 7. By this signal, the ignition timing operation is carried out in the ignition timing operating circuit 7, and an output is supplied to the switching circuit 8-1 therefrom. Furthermore, an output from the closed angle control circuit 8-2 is also supplied thereto, and the signal thus obtained is converted into an ON-OFF signal for the primary current of the ignition coil.

In the abovedescribed embodiment, the engine has six cylinders, whereby two knocking sensors are provided. However, the number of knocking sensors to be provided should not be limited to this, but one knocking sensor should be sufficient for the engine having four cylinders.

The abovedescribed first embodiment is particularly suitable for a carburetor type engine or an electronically controlled fuel injection type engine, in both of which a fuel supply system and an ignition timing system are provided independently of each other, however, the present invention should not be limited to this. Description will hereunder be given of a second embodiment of the present invention in which the present invention is applied to an engine wherein the ignition timing and the fuel injection period are controlled at the same time by use of a microcomputer.

Figure 8:
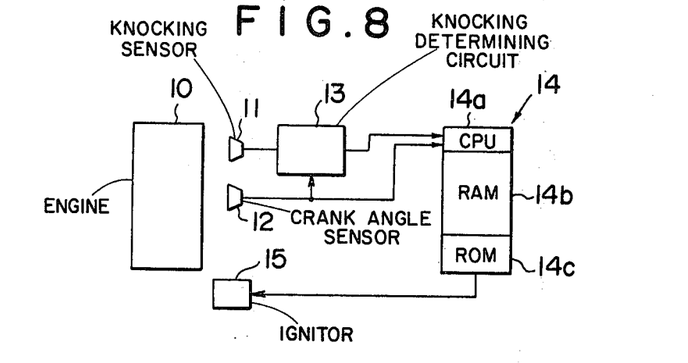
FIG. 8 is a block diagram showing the general arrangement of the second embodiment of the ignition timing control system according to the present invention.

As shown in FIG. 8, the present embodiment includees: a knocking sensor 11 provided on an engine 10 for detecting the knocking condition, similar to one in the aforesaid first embodiment; a crank angle sensor 12 provided on the engine for detecting the rotational angle of a crankshaft of the engine 10; a knocking determining circuit 13 for determining knockings in response to outputs from said knocking sensor 11 and said crank angle sensor 12; a microcomputer 14 provided with a central processing unit 14a, a Random Access Memory (hereinafter referred to as the "RAM") 14b for storing ignition timing correction values and a Read Only Memory (hereinafter referred to as the "ROM") 14c for storing preset ignition timings, for operating ignition timings for respective cylinders in response to an output from said crank angle sensor 12 and a knocking signal from said knocking determining circuit 13; and an ignitor 15 which is controlled in its ignition timing by an output from said microcomputer 14.

Figure 9:
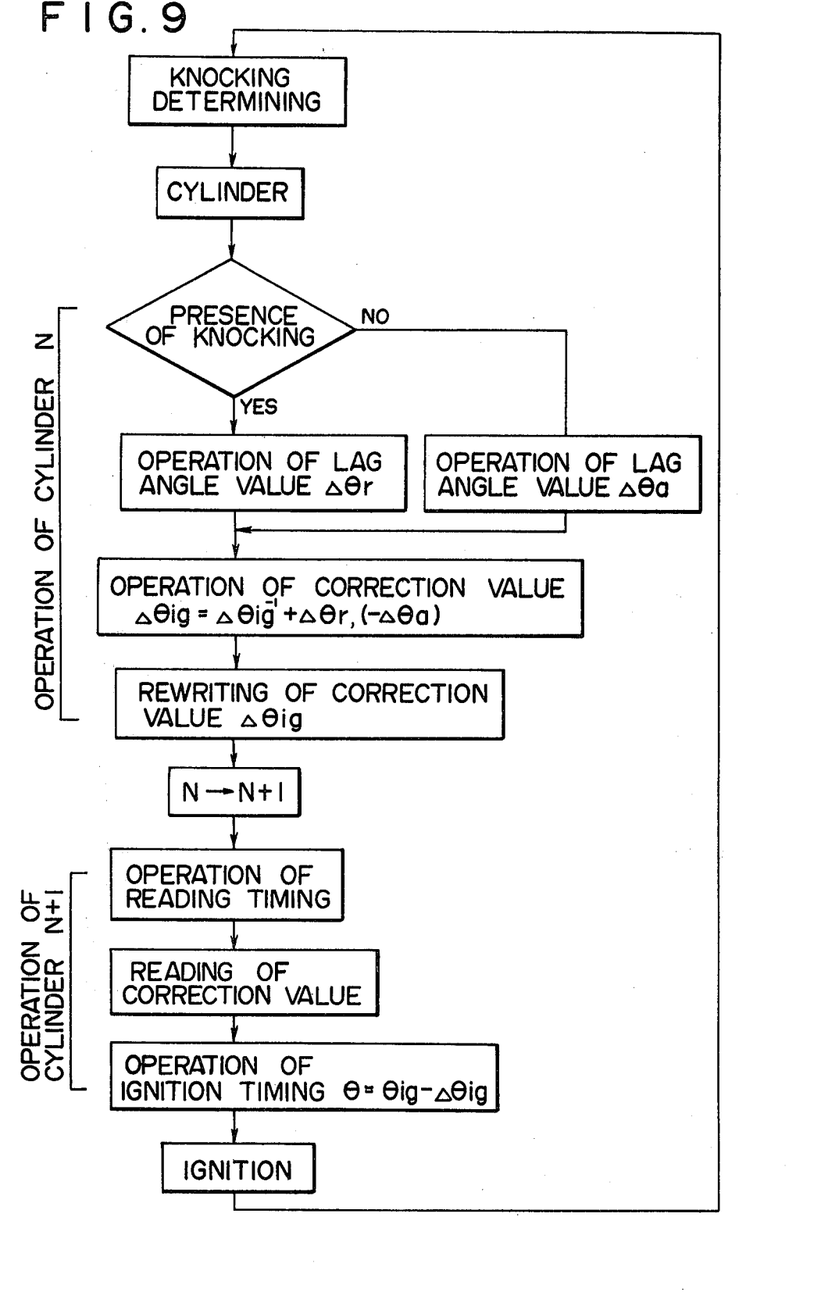
FIG. 9 is a flow chart showing the action in the second embodiment.

Description will now be given of action with reference to FIG. 9. Firstly, the ignition timings which seem optimum for the engine in the normal operating condition are stored in the ROM 14c of the microcomputer 14 as the preset ignition timings $\theta$ig. In the normal operating condition, the engine is controlled by this preset ignition timings $\theta$ig, however, in the case a knocking takes place due to change of gasoline used or the like, the knocking is detected by the knocking sensor 11 to select a cylinder for which operation should be made. A cylinder N selected for which operation should be made is determined as to whether it has the knocking or not, and, if the knocking is detected, then operation of lag angle value $\Delta\theta r$ is made, and, using an ignition timing correction value $\Delta\theta\text{ig}^{-1}$ one cycle before, operation of an ignition timing correction value $\Delta\theta\text{ig}N$ is made according to the following equation.

$$\Delta\theta\text{ig}N = \Delta\theta\text{ig}^{-1} + \Delta\theta r \quad (1)$$

The ignition timing correction value $\Delta\theta\text{ig}N$ thus obtained is stored by the RAM 14b for the cylinder. In the case the knocking is not detected, operation of advance angle $\Delta\theta a$ is made, and, in the same manner as above, using the ignition timing correction value $\Delta\theta\text{ig}^{-1}$ one cycle before, operation of the ignition timing correction value $\Delta\theta\text{ig}N$ is made according to the following equation.

$$\Delta\theta\text{ig}N = \Delta\theta\text{ig}^{-1} - \Delta\theta a \quad (2)$$

The ignition timing correction value $\Delta\theta\text{ig}N$ thus obtained is likewise stored in the RAM 14b for the cylinder. Secondly, during operation of the timing of reading of the correction value that follows, a correction value $\Delta\theta\text{ig}N+1$ is read out of the RAM 14b storing a correction value $\Delta\theta\text{ig}N+1$ for a cylinder N+1, and operation of an ignition timing $\theta$ is made according to the following equation.

$$\theta = \theta\text{ig} - \Delta\theta\text{ig}N+1 \quad (3)$$

The correction value $\Delta\theta\text{ig}N$ for the cylinder N thus obtained is read out during operation of correction value for the cylinder N−1 of the following cycle, and operation of the ignition timing $\theta$ is made according to the following equation.

$$\theta = \theta\text{ig} - \Delta\theta\text{ig}N \quad (4)$$

From the foregoing description, it should be apparent to one skilled in the art that the abovedescribed embodiment is but one of many possible specific embodiments which can represent the applications of the principles of the present invention. Numerous and varied other arrangements can be readily devised by those skilled in the art without departing from the spirit and scope of the invention.

What is claimed is:

1. An ignition timing control system in a spark ignition type internal combustion engine having multiple cylinders, comprising:

at least one knocking detecting means for detecting engine vibrations and emitting a vibration signal;

a knocking determining means for comparing the level of said vibration signal with a reference level and emitting a knocking signal when the level of said vibration signal exceeds said reference level;

a timing signal generating means for emitting a timing signal having one pulse at each predetermined crank angle;

a knocking feedback control means in which knocking feedback control circuits equal in number to cylinders of the engine are arranged in parallel to one another, for operating a correction ignition advance angle in response to said knocking signal and emitting a correction ignition signal;

a distributor means for selecting one knocking feedback control circuit of said knocking feedback control means in accordance with the number of pulses of said timing signal and supplying said knocking signal to the knocking feedback control circuit thus selected, said distributor means comprising a counter provided with output terminals equal in number to the cylinders of the engine and supplied to an input terminal thereof with said timing signal for successively emitting control signals from the output terminals between two pulses of said timing signal, analog switches having respective input and output terminals equal in number to the cylinders of the engine and connected in parallel to said knocking determining means in such a manner that said knocking signal is supplied to the respective input terminals with said analog switches adapted to be successively turned on by said control signals, and delaying circuits equal in number to the cylinders of the engine and connected to the output terminals of said analog switches, respectively, for delaying the knocking signal, which has pressed through said analog switch, for a predetermined period of time and supplying said knocking signal to each of said knocking feedback control circuits;

an integrator means for selecting one knocking feedback control circuit of said knocking feedback control means in accordance with the number of pulses of said timing signal and allowing said correction ignition signal of the knocking feedback control circuit thus selected to pass therethrough;

an ignition timing operating means for operating an actual ignition timing in accordance with said correction ignition signal thus passed through said integrator means and a basic ignition timing; and a switching means for controlling an ignition timing in response to an output signal from said ignition timing operating means.

2. An ignition timing control system as set forth in claim 1, wherein said knocking feedback control circuits each comprises:
- an oscillator circuit consisting of diodes, resistors and NAND gates, for receiving each output from said distributor means;
- a timing operating circuit for receiving an output from said oscillator circuit and an output from said distributor circuit;
- a knocking control circuit for receiving an output from said oscillator circuit and an output from said distributor means;
- a low level setting circuit consisting of a NOT gate;
- an updown counter, an output from said knocking control circuit being supplied to an updown terminal thereof and an output from said low level setting circuit being supplied to a reset terminal thereof; and
- a NAND gate for supplying a NAND of a carryout output of said updown counter and an output of said knocking control circuit to a clock terminal of said updown counter.

3. An ignition timing control system as set forth in claim 1, wherein said integrator means comprises:
- analog switches, outputs from said knocking feedback control circuits being connected to input terminals thereof;
- AND gates openable by the output from said timing signal generator circuit;
- said analog switches being connected to a signal line through resistors and supplying outputs to said ignition timing operating circuit.

4. An ignition timing control system in a spark ignition type internal combustion engine having six cylinders, comprising:
- two knocking detecting means for detecting engine vibrations and emitting respective vibration signals;
- a knocking determining means for comparing the level of one vibration signal higher than the other vibration signal with a reference level and emitting a knocking signal when the level of said one vibration signal exceeds the reference level;
- a timing signal generating means for emitting a timing signal having one pulse at each predetermined crank angle;
- a knocking feedback control means in which six knocking feedback control circuits are arranged in parallel to one another, for operating a correction ignition advance angle in response to said knocking signal and emitting a correction ignition signal;
- a distributor means for successively selecting one knocking feedback control means in accordance with the number of pulses of said timing signal and supplying said knocking signal to the knocking feedback control signal thus selected,
- said distributor means comprising a counter provided with output terminals equal in number to the cylinders of the engine and supplied at an input terminal thereof with said timing signal for successively emitting control signals from the output terminals between two pulses of said timing signal, analog switches having respective input and output terminals equal in number to the cylinders of the engine and connected in parallel to said knocking determining means in such a manner that said knocking signal is supplied to the respective input terminals with said analog switches adapted to be successively turned on by said control signals, and delaying circuits equal in number to the cylinders of the engine and connected to the output terminals of said analog switches, respectively, for delaying the knocking signal, which has passed through said analog switch, for a predetermined period of time and supplying said knocking signal to each of said knocking feedback control circuits;
- an integrator means for successively selecting one knocking feedback control circuit of said knocking feedback control means in accordance with the number of pulses of said timing signal and allowing said correction ignition signal of the knocking feedback control circuit thus selected to pass therethrough;
- an ignition timing operating means for operating an actual ignition timing in accordance with said correction ignition signal thus passed through said integrator means and a basic ignition timing; and
- a switching means for controlling an ignition timing in response to an output signal from said ignition timing operating means.

5. An ignition timing control system as set forth in claim 4, wherein said knocking feedback control circuits each comprises:
- an oscillator circuit consisting of diodes, resistors and NAND gates, for receiving each output for said distributor means;
- a timing operating circuit for receiving an output from said oscillator circuit and an output from said distributor circuit;
- a knocking control circuit for receiving an output from said oscillator circuit and an output from said distributor means;
- a low level setting circuit consisting of a NOT gate;
- an updown counter, an output from said knocking control circuit being supplied to an updown terminal thereof and an output from said low level setting circuit being supplied to a reset terminal thereof; and
- a NAND gate for supplying a NAND of a carryout output of said updown counter and an output of said knocking control circuit to a clock terminal of said updown counter.

6. An ignition timing control system as set forth in claim 4, wherein said integrator means comprises:
- analog switches, outputs from said knocking feedback control circuits being connected to input terminals thereof;
- AND gates openable by the output from said timing signal generator circuit;
- said analog switches being connected to a signal line through resistors and supplying outputs to said ignition timing operating circuit.

* * * * *